A. BERRY.
CAR JOURNAL BOX AND DUST GUARD THEREFOR.
APPLICATION FILED AUG. 23, 1909.
999,721.
Patented Aug. 1, 1911.
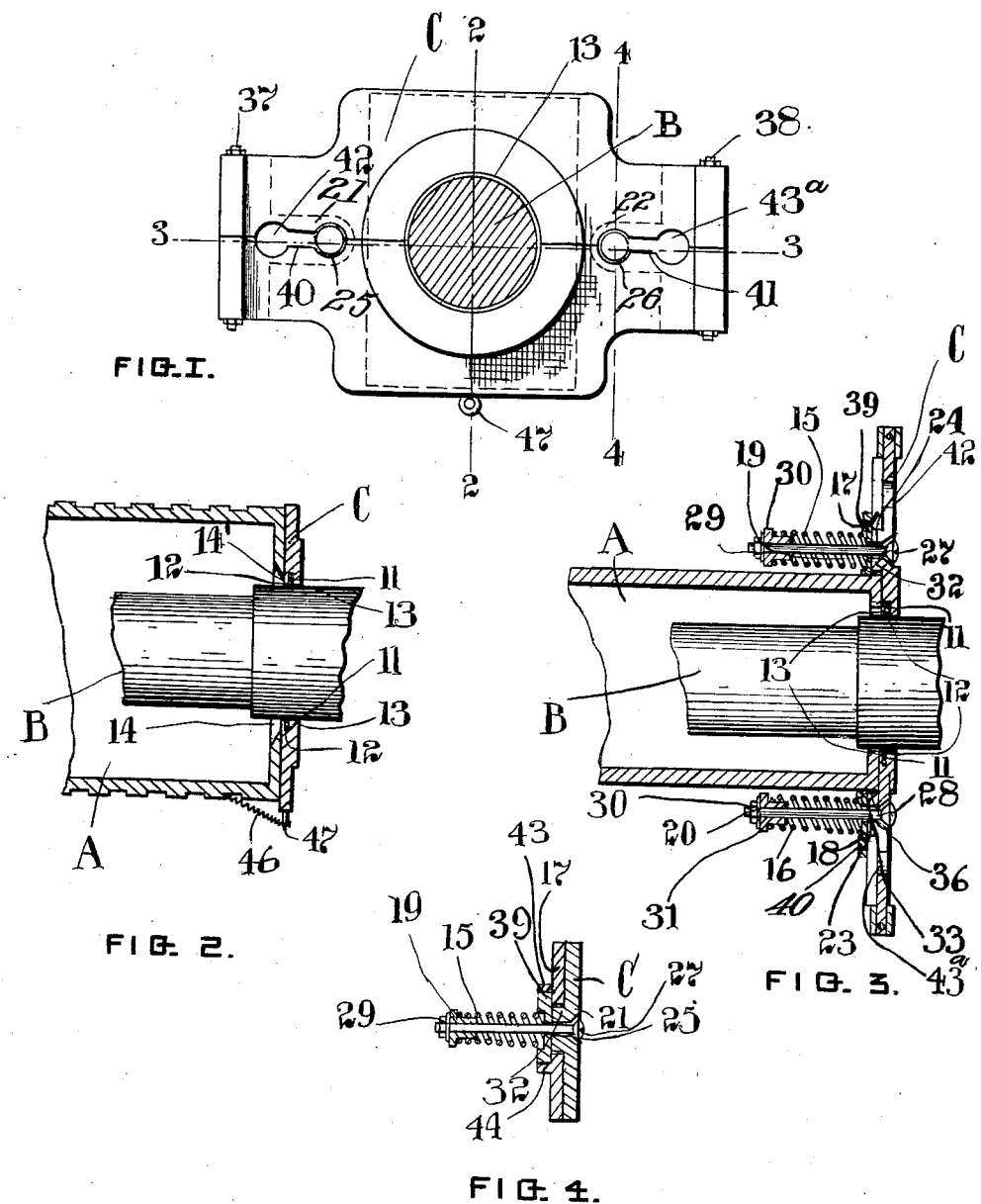
WITNESSES
INVENTOR
A. BERRY
BY
ATTY.

UNITED STATES PATENT OFFICE.

AUSTIN BERRY, OF OTTAWA, ONTARIO, CANADA.

CAR JOURNAL-BOX AND DUST-GUARD THEREFOR.

999,721. Specification of Letters Patent. Patented Aug. 1, 1911.

Application filed August 23, 1909. Serial No. 514,245.

*To all whom it may concern:*

Be it known that I, AUSTIN BERRY, of Ottawa, in the county of Carleton, Province of Ontario, Canada, have invented certain new and useful Improvements in Car Journal-Boxes and Dust-Guards Therefor, of which the following is a specification.

My invention relates to improvements in car journal boxes and dust guards therefor, of the type in which a guard plate is spring held in slidable engagement with the inner end of the box, and the objects of my invention are to provide improved means for preventing dirt or gravel finding its way into the box; this object being accomplished by the structure described in detail in the accompanying specifications and drawings, the features of novelty of which are set forth in the claims.

In the drawings, Figure 1 is an elevation of the rear side of the journal box having my improved dust guard plate thereon. Fig. 2 is a section on the line 2—2, Fig. 1. Fig. 3 is a section on the line 3—3, Fig. 1. Fig. 4 is a section on the line 4—4, Fig. 1.

In the drawings, like figures of reference indicate corresponding parts in each figure.

Referring to the drawings, A represents a journal box of any suitable construction, and B the journal extending therein.

C represents the dust guard plate slidably mounted on the inner end of the journal box and having close contact with the rotating journal. According to the present invention, this close contact is secured by providing a packing 11 at the line of contact of the plate with the rotary journal: the packing in the embodiment illustrated being formed of a suitable ring of packing material, held in an annular recess 12 formed around the aperture 13 through which the journal extends. To prevent oil passing up the inside of the box and between the box and the plate the inner edge of the aperture 14 on the box is beveled inwardly, as shown at 14'.

Adjustable spring means are provided for holding the guard plate against the end of the journal, and the particular means which I provide to accomplish this comprises spiral compression springs 15 and 16, the inner ends of which abut outwardly the inner ends of lugs 17 and 18 on the journal box, and the outer ends of which are connected by bolts 19 and 20 with corresponding lugs 21 and 22 provided on the dust guard plate, the bolts extending through suitable perforations 23 and 24 in the lugs of the box and through corresponding perforations 25 and 26 in the dust guard plate, the bolts preferably being formed with semi-spherical heads 27 and 28, counter-sunk in the surface of the dust guard plate. Nuts 29 and 30 are provided on the ends of the bolts abutting annular members 30 and 31 which fit into the top of the springs and permit adjustment to be made in the tension. To facilitate the removal of the bolts, the perforations 23 and 24 are preferably in the form of open slots leading to the outside edge of the lugs. It will be seen that in this construction, during the sliding movement of the plate, practically no change takes place in the spring as the bolts swing about their outer ends.

The means I provide to limit the movement of the dust guard plate comprise cylindrical projections 32 and 33 on the dust guard plate fitting into perforations 23 and 24 on the lugs 17 and 18, the diameter of the projections being less than that of the perforations, whereby the desired amount of play may be given to the dust guard plate.

In order to permit the ready renewal of packing in the dust guard plate and also to permit the ready removal of the plate, the plate is divided into two parts, or more, the division in the embodiment illustrated being made along a horizontal line, the two parts being held together by suitable means, as by the bolts 37 and 38 extending through suitable perforations in the opposite parts.

In order to hold the springs 15 and 16 in position when the bolts are loosened and prevent them falling off, their inner ends are attached to washers 39 and 40 which are removably held between laterally extending flanges 43 and 44 formed on the rear side of each of the lugs 17 and 18.

In order to enable the ready withdrawal of the bolts 19 and 20, the perforations 25 and 26 in the dust guard plate communicate with outwardly extending slots 40 and 41 which communicate with larger perforations 42 and 43ᵃ near the outside of the plate, these perforations being sufficiently large in diameter to permit the passage therethrough of the head of the bolt.

To prevent the weight of the dust guard wearing unduly the top of the journal I provide means to counter-balance the same, these means comprising a tension spring 46 extending from the underside of the journal box to a lug 47 provided on the guard plate.

It will be seen that the dust guard above described, possesses many advantages in that the parts may be readily separated in order to gain access to the interior of the box, further the manner of supplying the spring tension through the pivotal bolts permits the utmost freedom of action to the movement of the plate, while the projections extending into the apertures restrain this movement within predetermined limits.

As many changes could be made in the above construction, and many apparently widely different embodiments of my invention within the scope of the claims could be made without departing from the spirit or scope thereof, it is intended that all matter contained in the accompanying specifications and drawings shall be interpreted as illustrative and not in a limiting sense.

What I claim as my invention is:

1. The combination with a journal box having apertured lugs on the sides thereof, of a dust guard plate having projections of slightly less diameter than the apertures in the lugs and extending into said apertures, said projections being adapted during the movement of the plate to contact with the sides of the apertures and so limit the movement of the plate, and means for holding the plate in contact with the box, said means comprising bolts extending through the projections and springs extending between the bolts and the lugs on the journal box.

2. The combination with a journal box having apertured lugs in the sides thereof, of a dust guard plate having cylindrical projections of slightly less diameter than the apertures in the lugs and extending into said apertures, said projections being adapted during the movement of the plate to contact with the sides of the apertures and so limit the movement of the plate, and means for holding the plate in contact with the box, said means comprising bolts extending through the projections and springs extending between the bolts and the lugs on the journal box.

3. The combination with a journal box having lugs on the sides thereof, said lugs being formed on their surfaces with pairs of laterally extending flanges, of a dust guard plate slidably mounted on the end of the box, washers removably held between the pairs of flanges on the lugs and being tightly engaged thereby, springs connected to and carried by said washers, and means connecting said washers to the dust guard plate, whereby, said plate is held in resilient contact with the end of the box.

4. The combination with a journal box having apertured lugs on the sides thereof, of a dust guard plate having projections of slightly less diameter than the apertures in the lugs and extending thereinto, bolts having their heads held in the projections, and springs extending between the extremities of the bolts and the projections adapted to hold said guard plate in resilient contact with said journal box.

5. The combination with a journal box having lugs on the sides thereof, said lugs being formed with open slots opening on the outside edge, of a dust guard plate having projections of slightly less diameter than the width of the slots in the lugs and extending into said slots, bolts extending through said projections, washers abutting the innerside of the lugs and springs extending between said washers and bolts.

In witness whereof I have hereunto set my hand in the presence of two witnesses.

AUSTIN BERRY.

Witnesses:
RUSSEL S. SMART,
MARY C. LYON.

Copies of this patent may be obtained for five cents each, by addressing the "Commissioner of Patents, Washington, D. C."